(12) United States Patent
Sullivan et al.

(10) Patent No.: US 6,662,365 B1
(45) Date of Patent: Dec. 9, 2003

(54) UNIFIED PARENTAL LOCKS

(75) Inventors: Gary E. Sullivan, Mansfield, TX (US); Kim C. Smith, Colleyville, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/375,692

(22) Filed: Aug. 17, 1999

(51) Int. Cl.[7] .......................... H04N 7/16; H04N 5/445; H04N 7/18; G06F 3/00; G06F 13/00
(52) U.S. Cl. .......................... 725/25; 725/56; 725/74; 725/51; 725/85; 725/28; 725/27
(58) Field of Search .................... 725/25–50, 56, 725/74–85; 345/716–725

(56) References Cited

U.S. PATENT DOCUMENTS

| | | | |
|---|---|---|---|
| 4,888,796 A | * 12/1989 | Olivo, Jr. ................ | 340/5.74 |
| 5,382,983 A | * 1/1995 | Kwoh et al. ............. | 348/569 |
| 5,973,683 A | * 10/1999 | Cragun et al. .......... | 345/719 |
| 5,990,927 A | * 11/1999 | Hendricks et al. ...... | 725/109 |
| 6,025,869 A | * 2/2000 | Stas et al. ............... | 348/569 |
| 6,144,401 A | * 11/2000 | Casement et al. ....... | 428/27 |
| 6,163,316 A | * 12/2000 | Killian ..................... | 345/708 |
| 6,212,679 B1 | * 4/2001 | Vornsand ................. | 725/25 |
| 6,216,263 B1 | * 4/2001 | Elam ........................ | 725/151 |
| 6,312,336 B1 | * 11/2001 | Handelman et al. ..... | 463/1 |

* cited by examiner

Primary Examiner—Andrew Faile
Assistant Examiner—Chris Nalvenko
(74) Attorney, Agent, or Firm—Scott Charles Richardson; Chad W. Swantz; Suiter - West PC LLO

(57) ABSTRACT

A system and method for controlling a plurality of parental control subsystems within an entertainment system is provided. The system includes a computer interfaced to a plurality of audio and/or audiovisual devices, wherein at least two of the audio and/or audiovisual devices within the system each comprise a native parental control subsystem or locking mechanism having adjustable parameters. A software locking mechanism operates the computer to allow a user to input one or more general parental control parameters and then sets the adjustable parameters of each native parental control subsystem within the system by mapping the parental control parameters onto each separate, native mechanisms for each device.

25 Claims, 10 Drawing Sheets

UNIFIED PARENTAL LOCKS

FIELD OF THE INVENTION

The present invention relates generally to parental control devices for limiting access by children to certain types of audiovisual material. More specifically, the present invention relates to a user interface for a computer or other information handling system that provides a single point of user control for parental locks for multiple audio and/or audiovisual devices.

BACKGROUND OF THE INVENTION

The exposure of children to inappropriate material on television, such as sexual content, violence, coarse language, and so forth, has long been a concern. Recent technological developments now allow parental control of what children may see on television. For example, the so-called v-chip technology provides a decoder to decode program rating data encoded into a program at the time it is broadcast and to selectively pass or block television programming based on the rating level set.

Such parental control systems potentially eliminate the need for program censorship, thus providing greater freedom of expression for broadcasters, while providing an opportunity for parents to control, even in their absence, children's access to audiovisual material according to their own values and child-rearing philosophy. However, because parental control schemes place the responsibility of protecting children from viewing inappropriate material with parents, even the most fail-safe of parental control systems will be of little value if parents are unable or unwilling to exercise this responsibility. For example, television broadcasts use MPAA ratings, such as G, PG, PG-13, R, and TV ratings, such as TV-Y, TV-Y7, TV-Y7-FV, TV-G, TV-PG, TV-14, TV-MA. In some schemes, a "fantasy violence" (FV) indicator may be added to the TV-Y rating, and indicators for violence (V), sexual situations (S), language (L), and dialog (D), may be added to each of the TV-PG, TV-14, and TV-MA ratings. In addition to blocking individual programs based on ratings, television locking systems also provide channel locks. DVD systems may employ a numbered rating system, for example, a scale from 1–10, with associated MPAA ratings.

Because various audiovisual devices employ different locking schemes and different user interfaces, operation of the parental locks may be confusing. In some instances, a user may believe that certain rating levels and/or devices are locked when they are not, as where a device allows locking individual levels. In some devices, selecting a level locks that level and all levels above it. In other devices, however, an individual level may be locked, thus allowing, for example, the PG-13 level to be locked while the R rating level is not. Similarly, locking TV movies at a certain level has no effect on DVD movies. As additional rating schemes and locks become more commonplace, such as electronic program guide (EPG) or DSS ratings, digital television (DTV) ratings, etc., it is likely that the procedure for setting locking parameters will only become more complex.

Therefore, there exists a need for a system and method that provide simplified control of parental lock settings for audio and/or audiovisual devices in an audiovisual system.

SUMMARY OF THE INVENTION

In general terms, the present invention is a system or method for controlling one or more, and preferably two or more, parental control subsystems within an entertainment system. Although the invention will be described herein in terms of "parental control" or "parental locks," it should be recognized that such terms are intended to encompass any other person, in addition to parents who desire to prevent access of children to inappropriate audiovisual content, such as administrators of computers or networks available to the public, such as in libraries, on display in a retail environment, and so forth, or persons who display A/V material where children may be present, such as in-flight movies displayed on an aircraft, and so forth. The system includes a computer interfaced to an audio and/or audiovisual device having a native parental control subsystem or locking mechanism having adjustable parameters. In a preferred embodiment, the system includes a computer interfaced to a plurality of audio ad/or audiovisual devices, wherein at least two of the audio and/or audiovisual devices comprise a native parental control subsystem or locking mechanism having adjustable parameters. A software locking mechanism operates the computer to allow a user to input one or more general parental control parameters and then sets the adjustable parameters of each native parental control subsystem within the system by mapping the parental control parameters onto each separate, native mechanisms for each device.

Although the present invention will be described primarily in reference to TV broadcast ratings and MPAA motion picture ratings, it will be recognized that the present invention is not limited to the particular ratings systems or ratings locks described below and illustrated in the drawing figures. Other ratings include, for example, DVD ratings, electronic program guide (EPG) ratings such as Telstar, EchoStar, or other EPG systems, digital television (DTV) ratings, or any other ratings standards as are now available or as may become available in the future.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
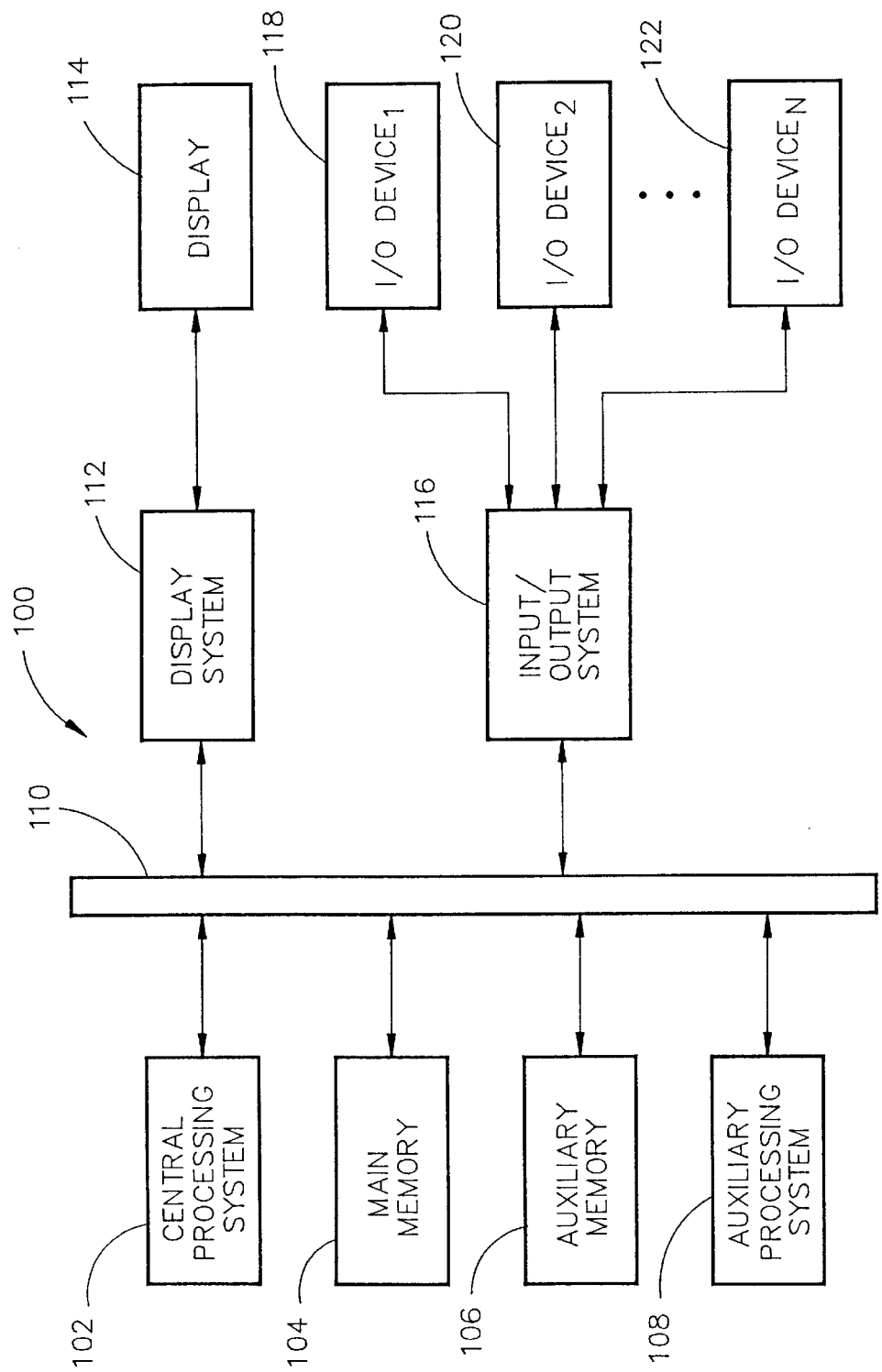
FIG. 1 shows a hardware system in accordance with the present invention.

Referring now to FIG. 1, a hardware system in accordance with the present invention is shown. The hardware system 100 shown in FIG. 1 is generally representative of the hardware architecture of a computer-based information handling system of the present invention. The hardware system 100 is controlled by a central processing system 102. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 100 include main memory 104, and auxiliary memory 106. The hardware system 100 may further include an auxiliary processing system 108 as required. The main memory 104 provides storage of instructions and data for programs executing on the central processing system 102. The main memory 104 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. The auxiliary memory 106 provides storage of instructions and data that are loaded into the main memory 104 before execution. The auxiliary memory 106 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 106 may also include a variety of nonsemiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 100 may optionally include an auxiliary processing system 108 which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 100 further includes a display system 112 for connecting to a display device 114, and an input/output (I/O) system 116 for connecting to one or more I/O devices 118, 120, up to N number of I/O devices 122. The display system 112 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like. The display device 114 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth. The input/output system 116 may comprise one or more controllers or adapters for providing interface functions between the one or more I/O devices 118–122. For example, the input/output system 116 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 116 and I/O devices 118–122 may provide or receive analog or digital signals for communication between the hardware system 100 of the present invention and external devices, networks, or information sources. The input/output system 116 and I/O devices 118–122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fiber Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

In one embodiment, the hardware system 100 may be what is often called a PC-TV or a convergence system, so named because such systems represent the convergence of computer and consumer electronics into a single system.

Figure 2:
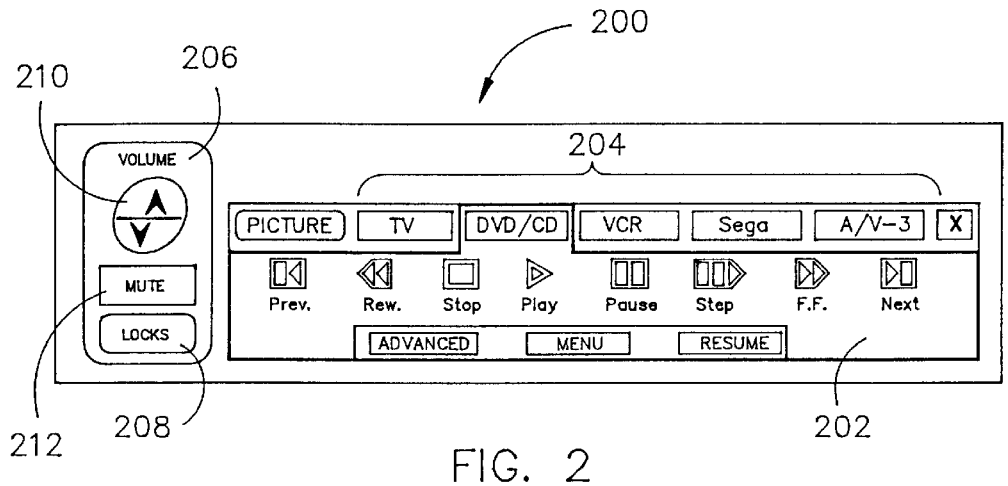
FIG. 2 shows an exemplary display screen layout of a control panel which may be used to control the audiovisual devices of a system according to the present invention.

FIG. 2 shows an exemplary display screen layout 200 of a control panel which may be used to control the audiovisual devices of the system 100. A region or window 202 contains therein various control buttons or switches such as stop, play, rewind, fast forward, and so forth, which function as on-screen visual representations of actual functions of the particular A/V device selected. A means for selecting a particular A/V device to control may also be provided. In the illustration shown, the means selecting a particular A/V device is series of buttons 204, which, when selected, will change the contents of region or window 202 so that the controls illustrated correspond to and control the actual controls for the attached A/V device.

As used herein, any on-screen graphical object which is described as a button or otherwise said to be selectable or otherwise accessed is intended to refer to on-screen objects which may be advantageously be controlled with a pointing device such as a mouse or other device for controlling an on-screen pointer or cursor and generating mouse button events, although it will be recognized that many of such objects may also be made accessible through keyboard input as well.

In the embodiment shown, the button 204 corresponding to DVD/CD is selected, with the controls therefor displayed in region 202. Highlighting, color differentiation, or other visual indicia may be provided to show the device selected. It will be recognized that other methods for selecting the A/V device may be provided, such as a menu hierarchies, pull down menus, pop up lists, radio button or check box lists, and so forth. In the event that there are additional A/V devices to be displayed in series 204, any conventional method may be employed, such as providing a scroll bar, resizing the size of layout 200, button resizing, providing additional rows, etc., as necessary, to accommodate the number of devices present.

The embodiment of FIG. 2 further contains a region 206 which contains controls common to all of the A/V devices, such as volume and mute buttons which control the overall sound output of the system. Also present within region 206 is the parental locks button 208. The locks button 208 is illustrated in region 206 to indicate that it is a generally applicable control rather than a device specific control, i.e., generally applicable to each device supporting the use of parental locks. It will be recognized that in implementing the generally applicable locking mechanism according to the present invention, it is not necessary to eliminate device specific parental lock software that may be provided nor is the present invention intended to preclude a user from individually adjusting each individual A/V device separately if a user so chooses. It will further be recognized that the present invention is not limited to any particular layout, and that the control panel 200 of FIG. 2 is provided merely to illustrate a preferred method of providing convenient user access to the parental locking system according to the present invention, and any other method of accessing the software may be provided, including via other software application or operating system environment. For example, other A/V control panel or media player software interfaces may be adapted to provide access to the generally applicable parental lock control in accordance with the present invention. Also, the present invention may also be implemented as a stand alone parental lock software application, utility, or control panel.

Figure 3:
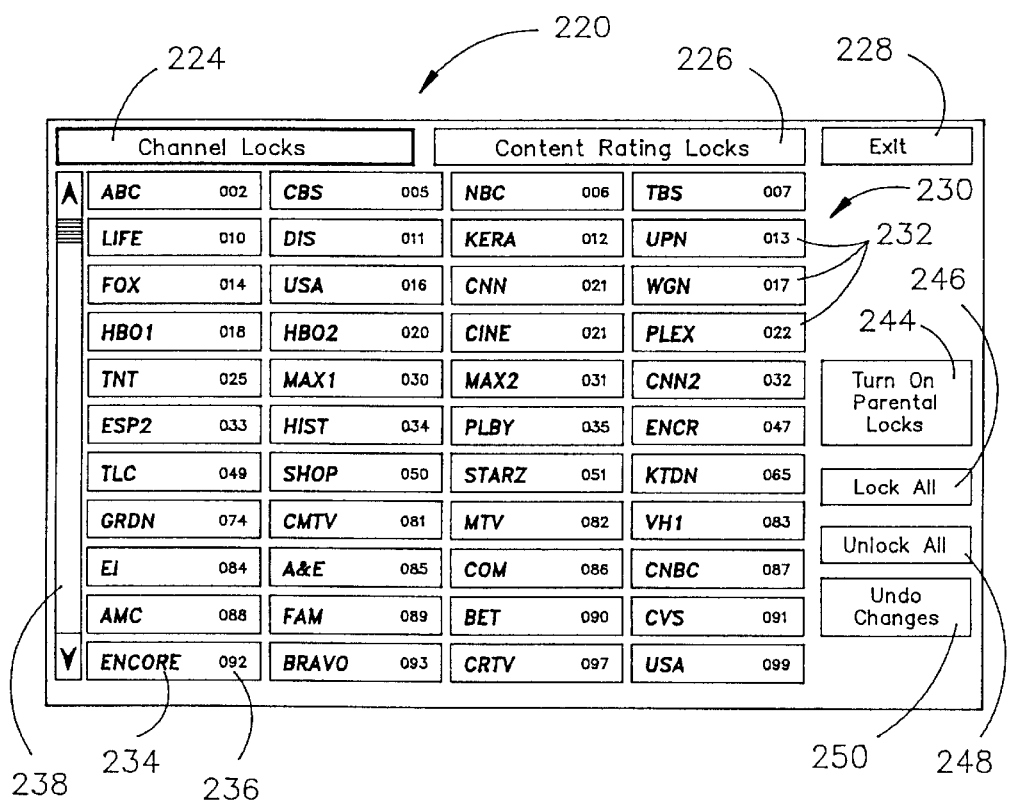
FIGS. 3 and 4 illustrate dual overlays of a parental lock interface according to one embodiment of the present invention.
Figure 4:
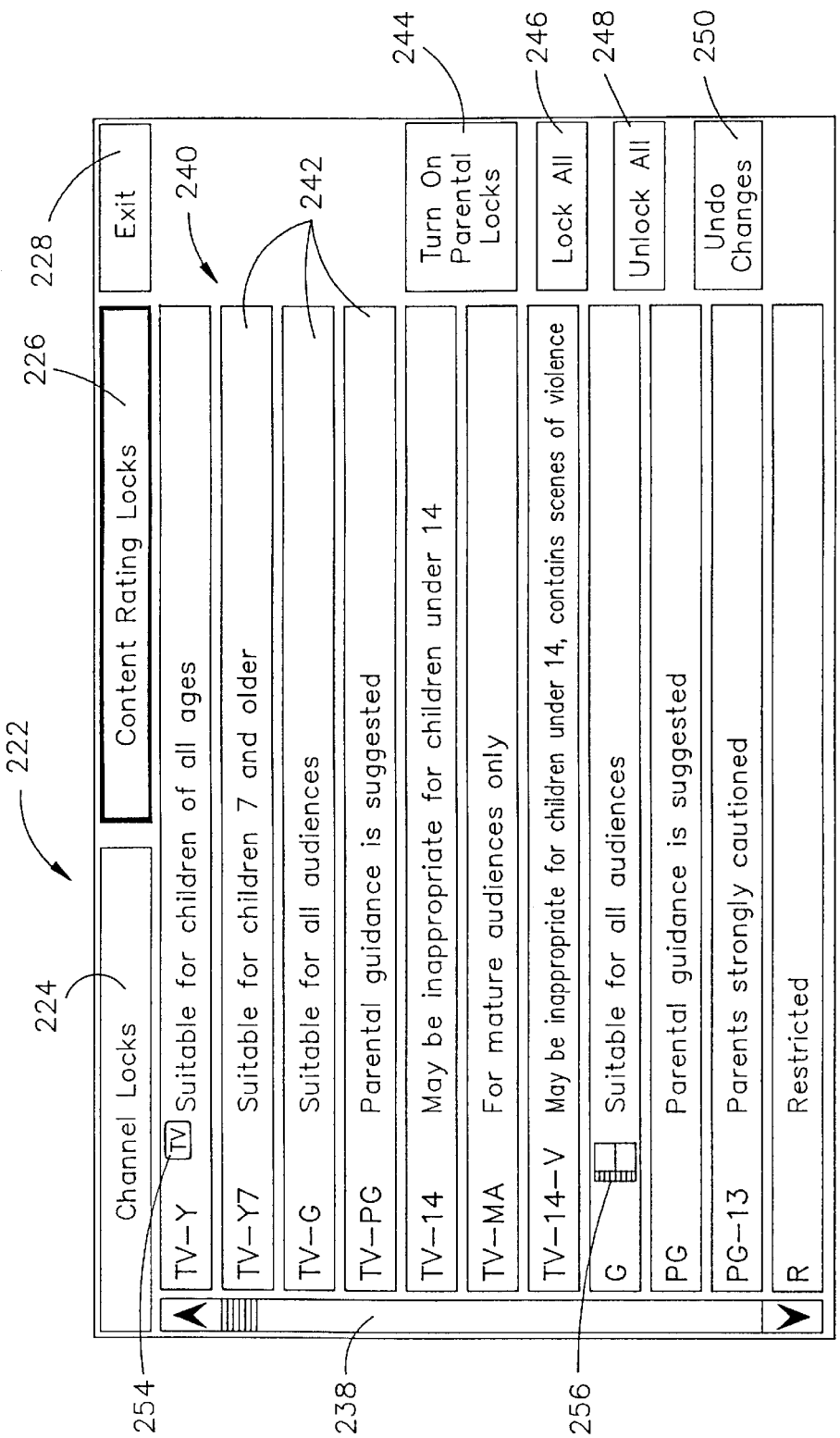

When the parental locks feature is accessed by a user, e.g., by selecting locks button 208, a parental locks interface such as that illustrated in FIGS. 3 and 4, is displayed. In one embodiment, an input dialog box will first appear requiring a password to be input prior to accessing the parental lock interface. In other embodiments, a password may not be required until an attempt is made to alter the settings of the A/V devices. In still other embodiments, the parental lock password may be required upon opening the A/V control panel, in which case the lock button 208 (FIG.2) would only appear, or would only be functional, when the correct password is entered. FIG. 3 illustrates one overlay 220 of a preferred dual overlay parental lock interface according to the present invention, with the second overlay 222 being illustrated in FIG. 4. Overlays 220 and 222 present channel lock button 224, which is highlighted (or otherwise made visually distinguishable) in FIG. 3 to indicate that it is the selected overlay. Likewise, content rating lock button 224 is highlighted (or otherwise made visually distinguishable) in FIG. 4, to indicate that the channel lock overlay is selected. Buttons 224 and 226 allow the user to toggle between the channel lock display screen 220 and the contend rating lock display screen 222. An exit button 228 is provided to exit the program. In one embodiment, the exit button returns the user to the software environment that was used to access the parental locks interface, such as an A/V control panel or media player interface of the type illustrated in FIG. 2.

Referring now to FIG. 3, the majority of the channel lock overlay 220 is dedicated to field 230 of channel cells 232. In each channel cell there is a channel identifying field 234 and a channel number field 236. The channel identifying field contains channel identifying indicia such as one or more of the channel number, channel call letters, channel name, and the like. In other embodiments, the channel logo may be depicted in the channel identifying field, for example, as each channel cell's sole channel identifying indicium, or, in addition to one or more of channel number, channel call letters, channel name, and so forth. In the channel lock overlay, a user may select particular channels to lock and unlock, for example, wherein clicking on a particular channel cell toggles that channel between a locked and unlocked state. Preferably, the indicia within the cells of locked channels will be distinguishable from unlocked channels. In the event that the number of channels available is greater than the number of channel cells 232 that may be displayed within the channel lock overlay 220, a scroll bar 238 may be provided to allow a user to bring additional channels into view in field 230.

Content rating button 226 brings up content rating overlay 222. Referring now to FIG. 4, the majority of the content rating lock overlay 222 is dedicated to field 240 of rating cells 242. Each rating contains a TV or movie rating and a brief description the rating. In the content rating lock overlay, a user may select particular ratings to lock and unlock. In one embodiment, clicking on a particular rating cell toggles that rating between a locked and unlocked state. Preferably, the indicia within the cells of locked ratings will be distinguishable from unlocked ratings. Since the number of ratings available will generally greater than the number of rating cells 242 that may be displayed clearly within the content rating lock overlay 222, a scroll bar 238 may be provided to allow a user to bring additional rating cells into window 222.

Figure 5:
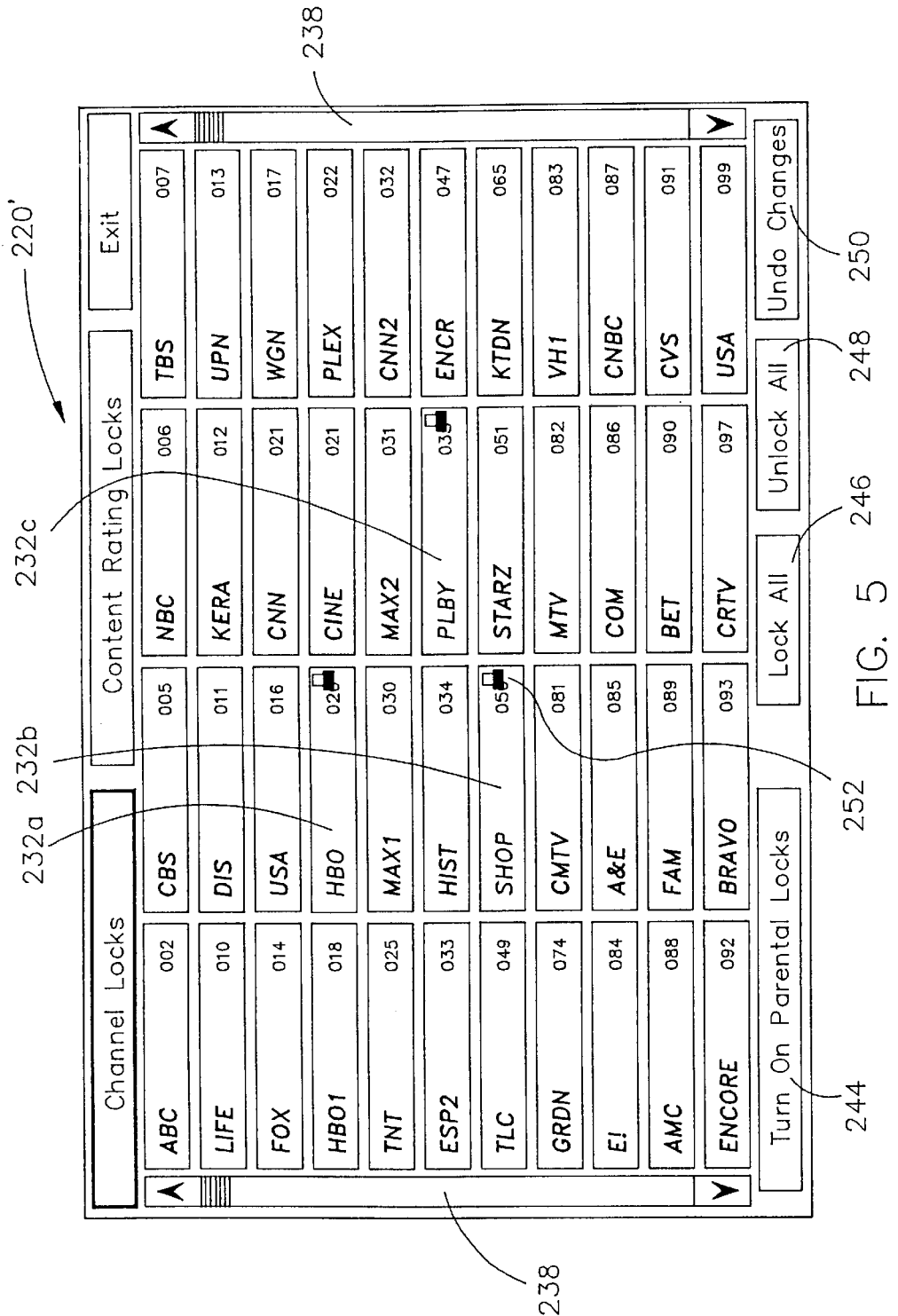
FIGS. 5 and 6 illustrate dual overlays of a parental lock interface according to another embodiment of the present invention.

Referring now to FIGS. 3 and 4, buttons 244–250 are provided for applying the parental lock settings to each device. A button 244 is provided to turn on parental locks after a user's selections have been made by mapping a user's selections to each native parental control subsystem. A lock all button 246 for locking all devices and an unlock all button 248 for removing all locks may be provided. A user's previous settings may be saved in memory and an undo button 250 may be provided that allows a user to discard any changes made and to reinstate earlier settings. If a password was not required to access the parental lock interface itself, a dialog box requiring entry of a password may be provided when the user selects one of buttons 244–250. FIG. 5 shows an alternate channel lock overlay 220', similar to the embodiment shown in FIG. 3, wherein buttons 244–250 are located at the bottom of overlay 220'. Likewise, FIG. 6 shows an alternate content rating lock overlay 222', similar to the embodiment shown in FIG. 4, wherein buttons 244–250 are located at to bottom of overlay 222'.

Figure 6:
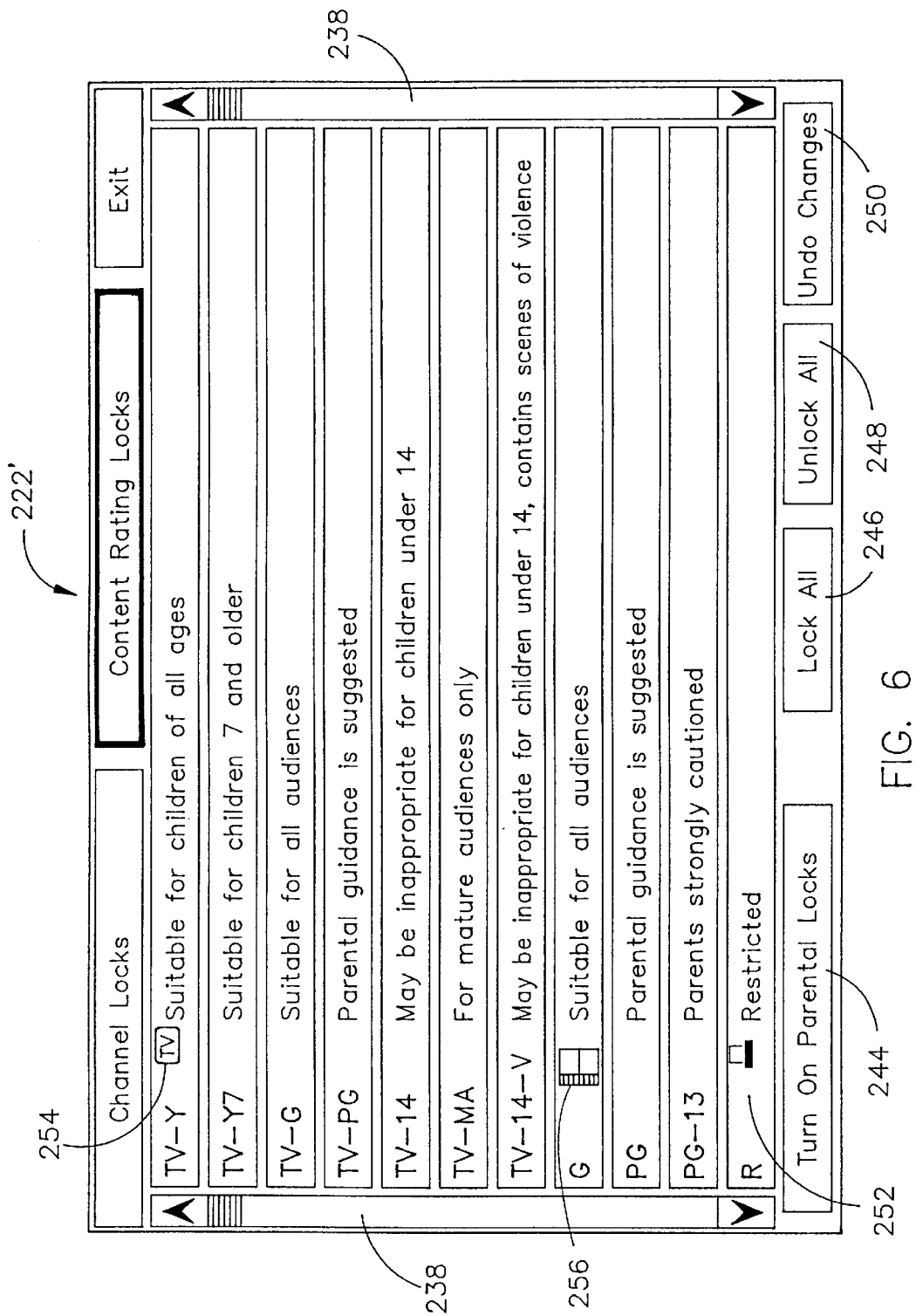

FIGS. 5 and 6 also depict an embodiment providing a visual indication of the channels and ratings that have been selected to be locked. Channel cells 232a, 232b, and 232c, are illustrated in FIG. 5 with optional padlock icon 252 appearing therein. In FIG. 6, the R rating is shown in a similar manner as being locked. Any manner of differentiating unlocked channels from unlocked channels and locked ratings from unlocked ratings may be employed, either as an alternative or in addition to a graphic or iconic indication such as padlock icon 252. Exemplary methods (not shown) include the use of differential color schemes, "graying out" the call letters/names of locked channels (for example, as is often done in software application environments for menu selection items that are unavailable) or otherwise changing the channel cell text and/or background color for the locked channels and ratings as compared to the unlocked channels and ratings. FIGS. 5 and 6 also depict a preferred scroll bar layout wherein scroll bars 238 are provided on each side of the channel field (FIG. 5) or ratings field (FIG. 6), thereby reducing the need to shuttle the pointer back and forth across the display screen when making selections. Other graphical indicia may be employed to separate television and movie ratings, such as segregation of the television and movie ratings within the field (see, e.g., FIG. 8), the use of a separator bar between television and movie ratings, and so forth.

Figure 8:
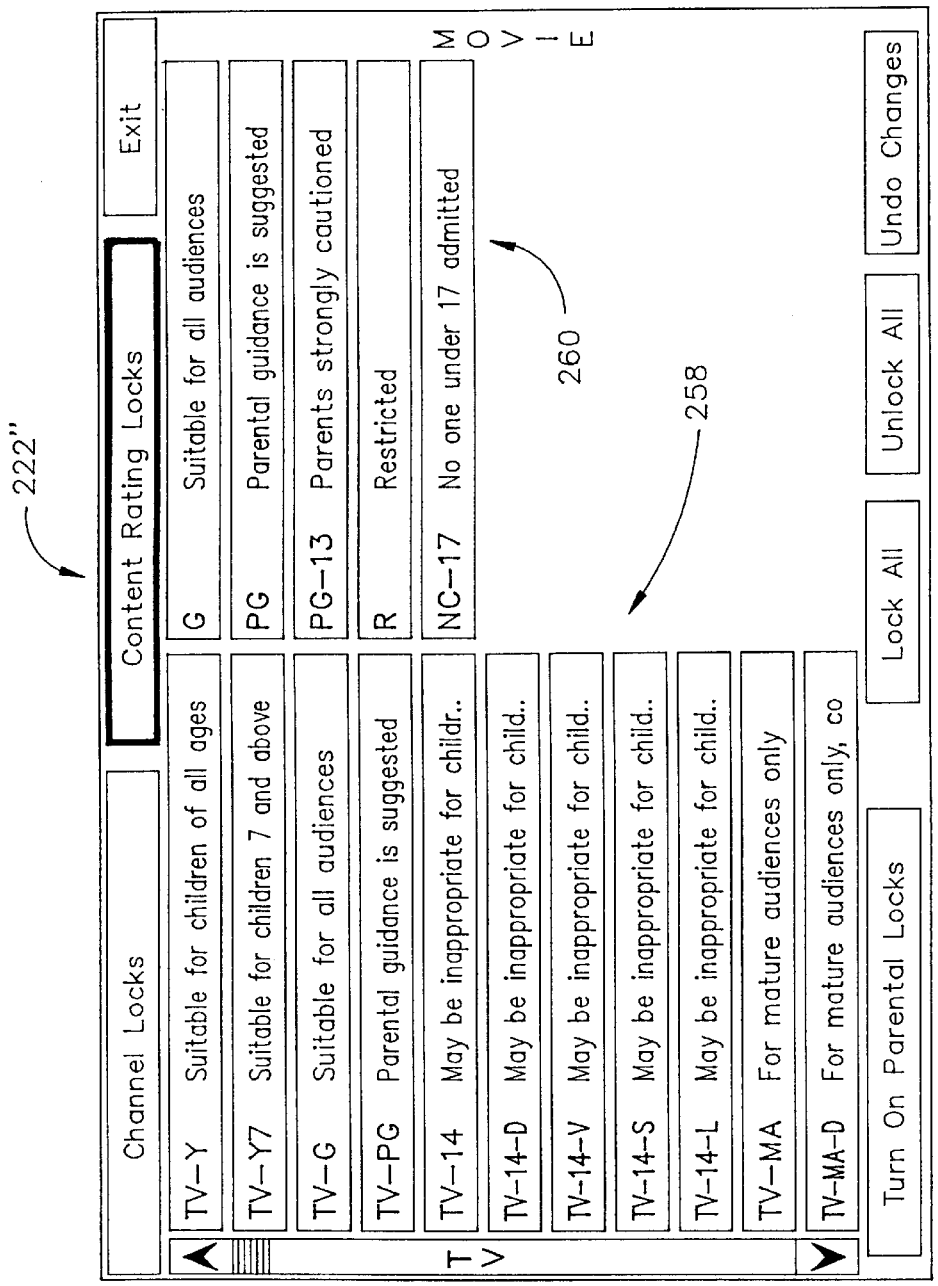
FIG. 8 illustrates a content rating lock overlay having separate television and movie rating fields.

In FIGS. 4 and 6, the ratings applicable to television are illustrated by an optional TV icon 254 and the ratings applicable to motion pictures are identified by an optional motion picture icon 256. FIG. 8 illustrates an alternate content rating lock overlay 222", which is similar to overlay 222' shown in FIG. 6, but wherein a separate TV rating field 258 and movie rating field 260 are provided.

Figure 7:
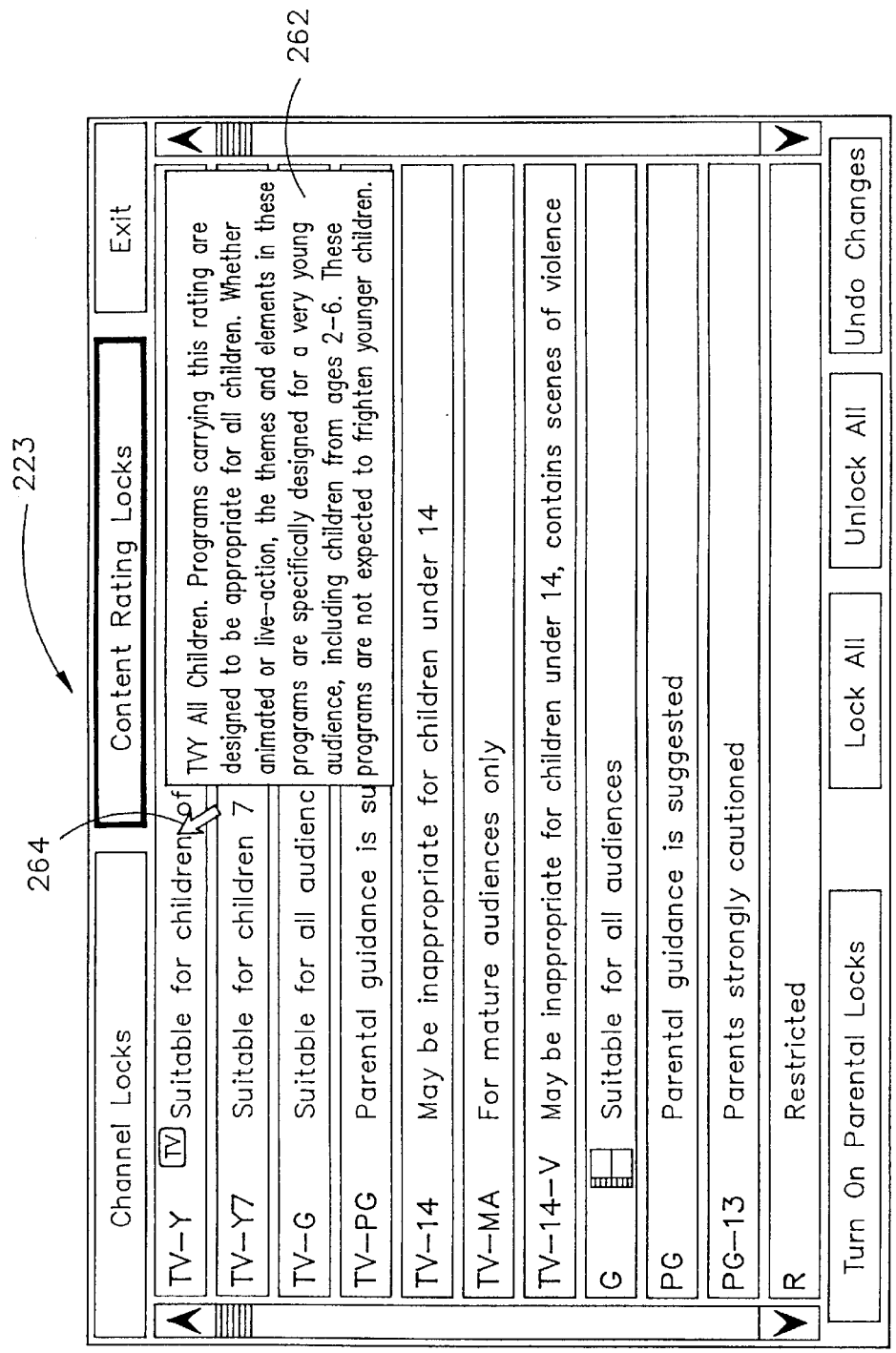
FIG. 7 illustrates an embodiment of a parental lock interface overlay providing optional "context" information.

Additional features may also be provided in further embodiments of the present invention. For example, FIG. 7 depicts an embodiment where additional "context" information may be provided to the user. For example, a more detailed explanation of a particular rating may be obtained. FIG. 7 depicts content rating lock overlay 223 with a context information box 262 displayed. Such context information boxes may be accessed through a number of methods. In one embodiment, a user may control a pointer 264 so that it hovers or remains stationary over a particular content rating cell for a predetermined period of time. Upon hovering over a particular cell for the predetermined period of time, context information box 262 may be brought up containing information corresponding to the appropriate cell. In the illustration, the cursor is shown located over the TV-Y cell and, accordingly, additional information about the TV-Y rating is shown. In this manner, much more information than could readily fit on a single screen becomes rapidly accessible. In a variation, not shown, similar information may be provided through a context menu that is made available through a secondary mouse button event, i.e., by "right clicking" in a particular cell for which additional information is desired. A context menu so accessed display the additional information in a pop up text box, either directly or as an item selectable from a menu including a "more information" menu selection item and also containing any number of additional features. Such additional features may include, for example, menu items for locking and unlocking the rating, and so forth. Also, detailed TV channel information (not shown) may be displayed for particular TV channel cells in the channel lock overlay in similar manner.

In each of the above described embodiments, there has been described a parental lock interface wherein TV channel cells (FIGS. 3 and 5) or content rating cells (FIGS. 4, 6, 7, and 7) may be selected directly from the interface by a user and hen applied to the various devices within the audiovisual system. In one embodiment, a more interactive interface and method for obtaining input from a user may be employed. Although the above described parental locks interface is intuitive, some users may prefer an interface which is even simpler and more automated. In one embodiment, a human oriented set of questions may be provided that asks about the individuals who will use the system and their ages. Questions may also be asked about the level of locking desired in general terms. In one embodiment, the questions a can be posed in an interactive or wizard format wherein a series of questions are asked and wherein the answers to the questions dictate the subsequent questions. For example, such a questionnaire or wizard interface might begin by asking if any of the users of the system are children. If all of the users are adults, the program might then simply recommend that all devices be unlocked. On the other hand, if the user indicates that a child or children will be using the system, the wizard may then query as to the children's ages. After the children's ages are entered by the user, the wizard may then recommend locking all programming which correspond to the age of the youngest child. For, example, if a user indicates that there are children under the age of 13, the user interface could then suggest that all programs rated for audiences 13 and older be locked. The software would then apply a lock on all MPAA levels PG-13 and higher and lock all TV shows with a rating of TV-14 and higher.

Figure 9:
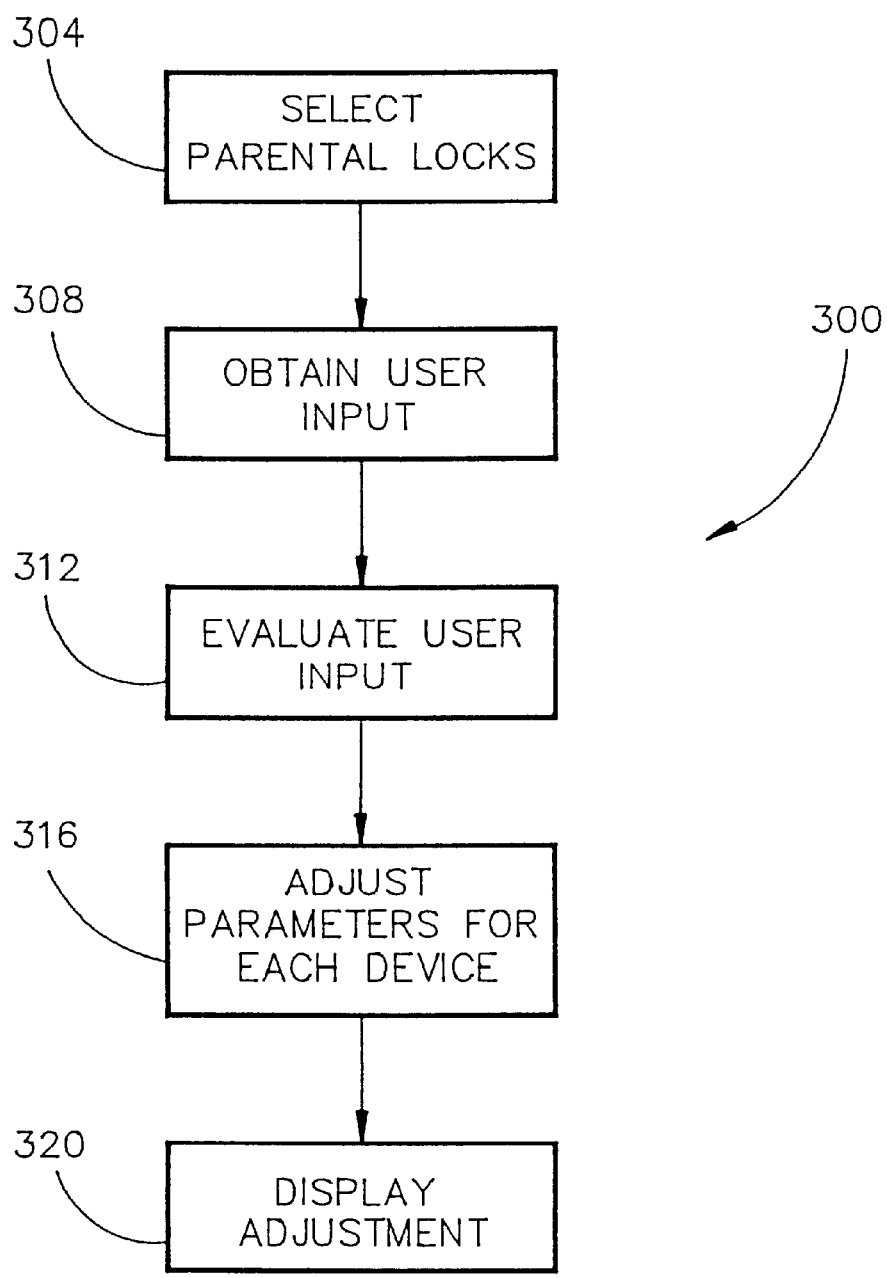
FIG. 9 is a flow chart illustrating a method according to the present invention.

The method of establishing the results discussed above is summarized in flow chart form in FIG. 9. The flow chart 300 illustrates the methodology of the present invention in five basic steps. Specifically, the parental lock interface is selected by a user in step 304. This may be done by selecting the parental lock feature in an A/N device control panel, such as the control panel exemplified in FIG. 2. The user then uses the parental lock interface to select the material and/or channels to be locked in step 308. In step 312, the user input is then evaluated and converted to the equivalent or closest settings for each device that supports locks. The computer may textually or graphically display the level of parental locking selected in step 316, and, in step 320, adjust the parental locking parameter of each subsystem so that the operation of each of the parental lock subsystems is consistent with the user input of step 304.

Figure 10A:
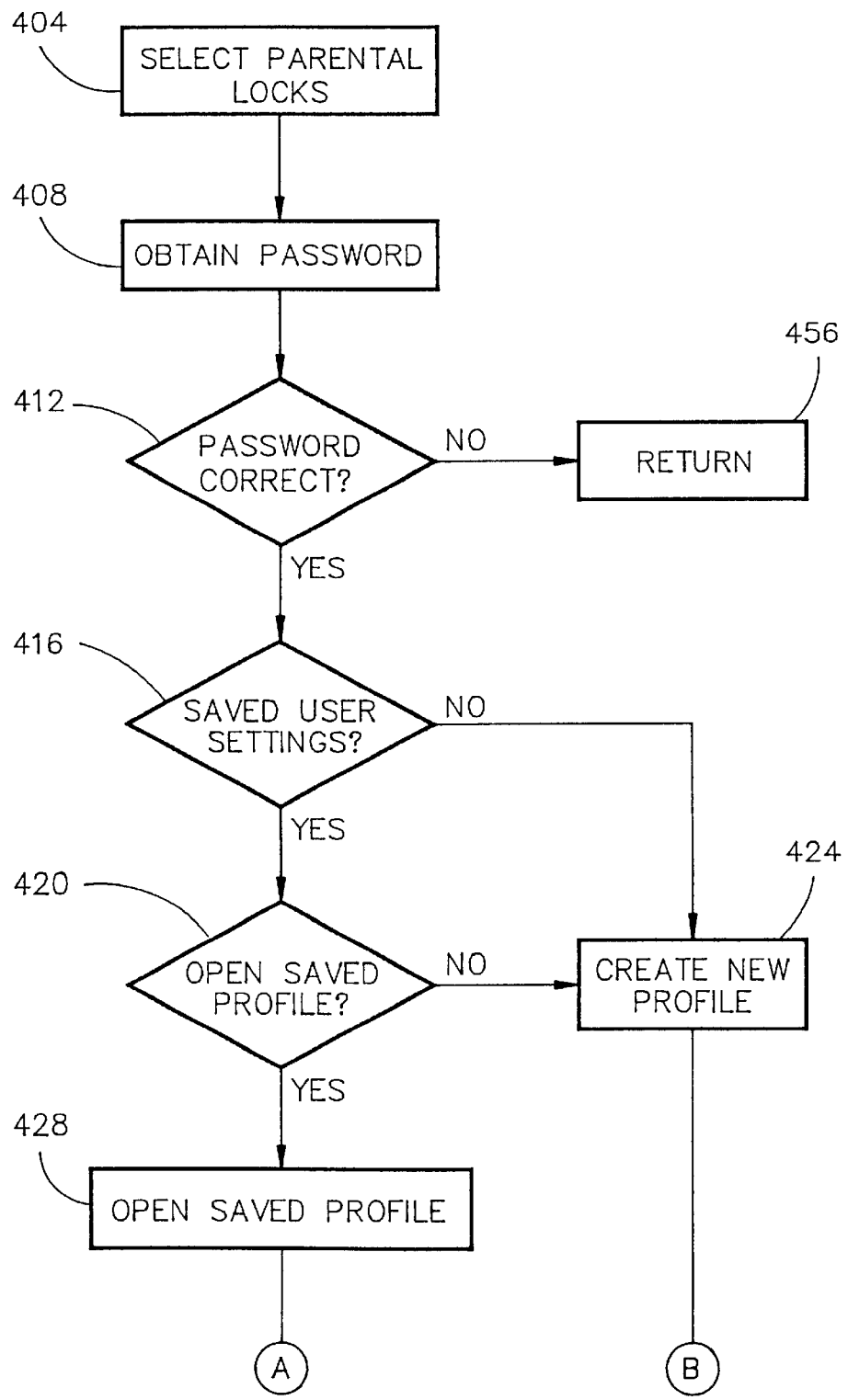
FIGS. 10A and 10B are a flow chart outlining a method according to the present invention accommodating multiple user profiles.
Figure 10B:
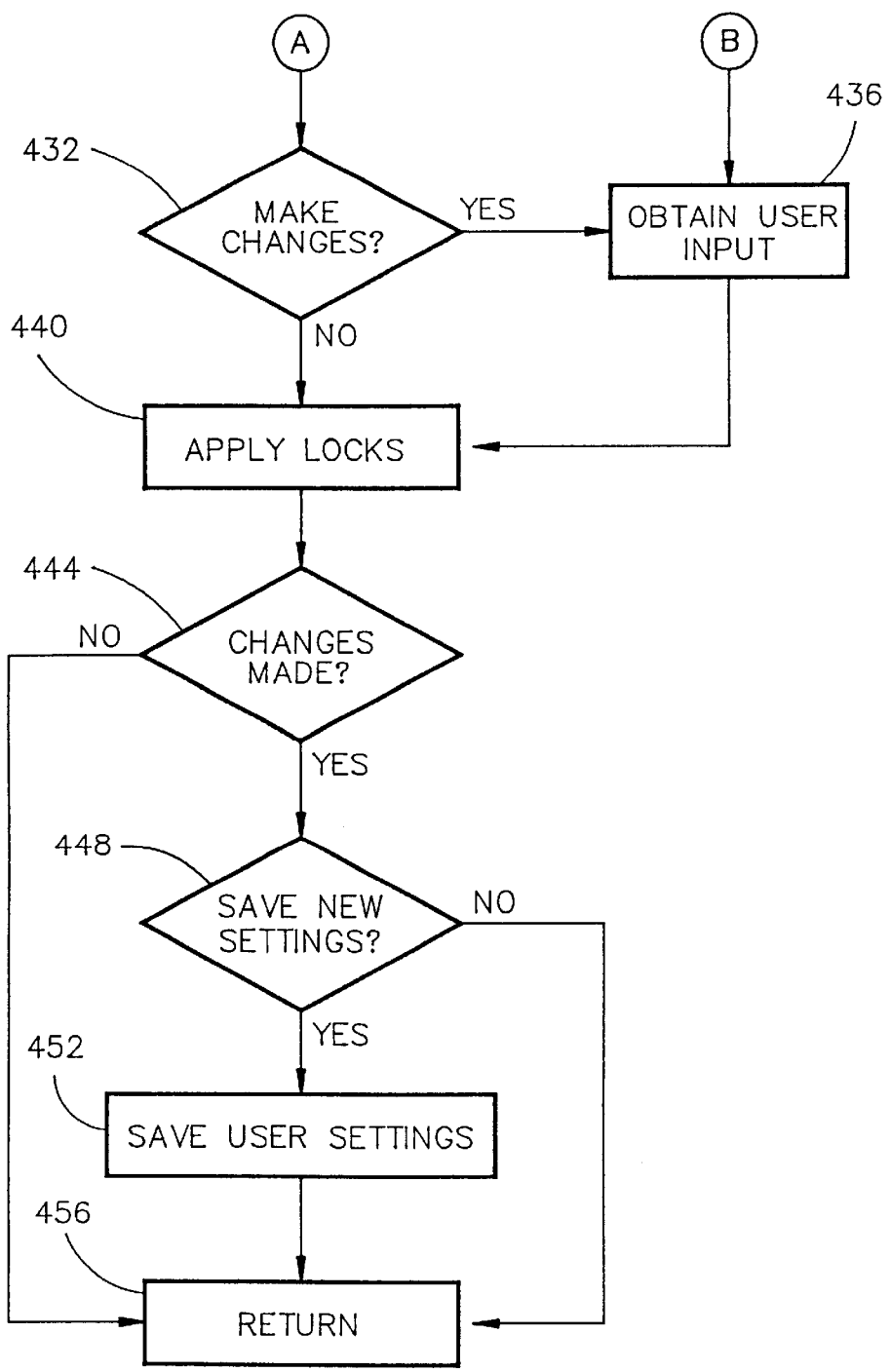

FIGS. 10A and 10B together illustrate a flow chart outlining a method wherein multiple user profiles may be created and saved in memory if desired. In step 404, the parental locks feature is selected, e.g., via button 208 (FIG. 2) from the A/V control panel 200 (FIG. 2). In step 408, a password is obtained. If the password determined to be incorrect in step 412, the process ends, for example, by returning to software application or overlay from which the parental locks feature was selected, such as an A/V control panel as depicted in FIG. 2. Alternatively, the process may allow one or more additional attempts at entering the password. It will be recognized that the password entry step may be at any other convenient point, such as when initially running an A/V control panel or other software environment that contains a link to the parental locks interface, or, after the parental locks interface is displayed but before any parental lock changes are actually made to the attached devices supporting parental locks. Other features designed to prevent tampering may also be included. For example, if incorrect passwords are entered a predetermined number of times, the system may be instructed to disable access to all A/V devices, preferably via a user selectable parameter. As an alternative to or addition to barring all access to the A/V features of the system, this information of attempts to breach the security may be reported to parents in the form of a data file, pop up message, and so forth.

Upon correct entry of the password in step 412, the system determines if there are any previously saved user settings or profiles in step 416. Previously saved user settings may be those previously saved by the user or they may be default settings for different age groups which may be used as a template which may used and, if desired, modified in creating new profiles. If no saved user profiles are detected, the user may create a new user profile in step 424. In one embodiment, the new user profile may be generated by simply allowing the user to lock channels and content by manipulating the interface directly and then prompting the user whether to save the profile created as a data file which may simply be reloaded at a later time if subsequent changes are made. Where there are children of different ages, separate profiles could be selected for different children (or age groups). In one embodiment, a saved profile may also be associated with a particular user, for example, as where an operating system or other software application provides for defining a plurality of user profiles. Such operating system or application software typically allows different users to customize desktop appearance, allows or bars access to various data, software, or other features within a system, and so forth.

If there are previously saved user profiles, they may be displayed in step 420 and the user given an option of selecting one. The user may also be informed of which user profile is currently selected, if any, or other status of parental locks. If the user wishes to open a preexisting user profile in step, 420, the selected profile is opened in step 428. If previously saved user profiles exist, but the user wishes not to use any of them, the user may create a new profile in step 424.

If a preexisting user profile is opened in step 428 and the user simply wishes to use the settings without further changing them in step 432, the locks are applied to each device in step 440. If the user chooses to create a new user profile in step 424, the process proceeds to step 436 for user input. Likewise, if the user opens a preexisting profile with an intent to modify that profile, the process goes to step 436 and the user's input is obtained. After the user's input has been entered, the locks are applied in step 440.

In step 444, it is determined whether any changes were made, i.e., whether any new user profiles were created or whether any previously saved profiles were modified. If not the program terminates at step 456. In one embodiment, the user is returned to an A/V control panel. If changes were made (i.e., user input was obtained in step 436 either for the purpose of creating a new user profile or modifying an existing one), the user may then be prompted whether to save the changes in step 448. If saving the changes is not desired, for example, a new user profile was created for temporary, one-time use, or if a modification to an existing user profile is intended as a temporary, one-time change, the program exits to step 456 without saving the changes. If the user wishes to save any changes made or new profiles created, they are saved in step 452 before the program is exited in step 456.

In the above described process of FIGS. 10A and 10B, it will be recognized that the user input may be made by allowing the user to manipulate the user interface directly, with the process proceeding as the user makes selections. As an alternative, the input may be obtained in a more directed or interactive manner in the form of a questionnaire or wizard as described above.

Other features and embodiments are contemplated as well. For example, after setting the ratings locks for devices which support them, the system will notify the user of any device which does not support parental locks. The user could be informed of other content that may not or is likely to not carry ratings, such as many DVD titles currently on the market.

In the simplest embodiment, where a user selects a particular rating, that rating and all higher ratings will be locked. In a more flexible embodiment, the ratings may be selected individually. Preferably, the manner of operation in this regard may be selected by the user, e.g., in a user preferences options field.

Where extended TV ratings are selected, e.g., the software could recommend a setting and let the user know which devices support extended ratings and which do not. In one embodiment, individual ratings and rating variations are individually selectable. In another embodiment, if a user selects a general rating, such as TV-14, that rating and any variations thereof, such as TV-14-V, TV-14-S, TV-14-L, and TV-14-D will also be locked. In another embodiment, if a specific rating variation is selected, such as TV-14-V, then only that rating variation will be locked.

In one embodiment, since many programs still do not carry program ratings, the system could suggest that the user review the list of all television channels and identify and lock any networks that tend to show adult content. A list of television channels my also be suggested on the basis of user input, such as user responses to a wizard-type questionnaire as described above.

In one embodiment, personal remote control devices for specific users may be provided and associated with a specific user profile stored in the system. In this manner, the system can identify the remote control device used, determine the user associated with the identified remote control device, and apply the parental locks to each device according to the user profile associated with the remote control device.

The parental locks are not necessarily limited to TV ratings and movie content ratings. For example, a PC games lock feature may also be provided wherein a database of PC games may be provided having a MPAA or TV-type rating for each game. Such a games lock feature could automatically follow the locks set for broadcast and movie content. In one embodiment, a user may see a list of all titles installed on the system to explicitly lock any titles not contained in the database.

Similarly, the broadcast and movie ratings input may be also be used to configure installed Internet browsers or Internet filtering software.

In another embodiment, the locking system may be adapted to bar access by children or other unauthorized users to pay per view services, video on demand services, and so forth.

In yet another embodiment, to further facilitate the use of parental locks, the information regarding a user's parental control needs may be gathered and initiated by the manufacturer at the point of sale.

The present invention may be adapted to further enhancements in what is sure to be an ever-increasing technology. As advancements in A/V broadcast technologies are made and as mass storage capabilities are increased, it is likely that a further proliferation of parental control standards will occur. For example, rather than rating entire movies or programs, ratings of some materials, and thus the application of parental locks, may involve blocking of individual scenes rather than entire programs or movies. Likewise, as sufficiently large random access mass storage devices become available (or where transmission bandwidth would permit), parental control devices may involve scene replacement technology. For example, a movie, which with the exception of certain scenes may otherwise may be acceptable for most viewers, may be stored (or broadcast) with alternative scenes containing different levels of violence, language, sex, acceptable for different age levels. As such, a parental control system may provide the option of allowing playback with acceptably rated scenes substituted for the original scenes. The present invention may be adapted to such standards as they may occur by providing a general, centralized interface.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A method for operating and controlling a plurality of parental control subsystems in an audiovisual system, wherein the audiovisual system has a computer and wherein said system is configurable by a graphical user interface (GUI), comprising:

interfacing one or more audio and/or audiovisual devices to said computer, wherein at least one of said audio and/or audiovisual devices comprises a native parental control subsystem having adjustable parameters;

operating the computer to receive user input, said user input allowing a user to choose one or more general parental control parameters; and operating the computer to set the adjustable parameters of each native parental control subsystem within said system, wherein the adjustable control parameters of the native parental control system include a first parental control scheme and a second parental control scheme, the first parental control scheme being incompatible with the second parental control scheme, and wherein the control programming allows a user to choose general control parameters of the first parental control scheme and the second parental control scheme.

2. A method according to claim 1, wherein said one or more audio and/or audiovisual devices comprises a plurality of audio and/or audiovisual devices interfaced to said computer, and wherein at least two of said audio and/or audiovisual devices comprise a native parental control subsystem having adjustable parameters.

3. A method according to claim 2, wherein said at least two audiovisual devices are multimedia devices.

4. A method according to claim 3, wherein said multimedia devices are one or more DVD devices, video tape devices, television devices, or any combination thereof.

5. A method according to claim 4, wherein said television devices are selected from the group consisting of televisions, cable television set top boxes, digital satellite service set top converters, television tuner cards, and any combination thereof.

6. A method according to claim 2, wherein said user input comprises user responses to a series of on-screen questions.

7. A method according to claim 6, further comprising the step of recommending television channels to lock.

8. A method according to claim 6, further comprising the step of recommending audiovisual content ratings to lock.

9. A method according to claim 2, wherein said user input comprises user selection of on-screen items displayed via said graphical user interface.

10. A method according to claim 9, wherein said graphical user interface comprises a first on-screen overlay, said first on-screen overlay comprising audiovisual content-based user-selectable items, and a second on-screen overlay, said second on-screen overlay comprising television channel-based user-selectable items.

11. A method according to claim 10, wherein said audiovisual content-based user selectable-items comprise television programming ratings, movie ratings, or both.

12. A method according to claim 10, further comprising the step of operating the computer to provide on-screen visual indicia of user input.

13. A method according to claim 2, further comprising step of displaying an on-screen listing of audiovisual devices which do not support locks.

14. A method according to claim 2, further comprising the steps of:

identifying the computer games installed on the system;

providing a database of computer game ratings analogous to audiovisual content ratings; and operating the computer to lock any computer games that exceed the parental control parameters selected by the user for audiovisual content.

15. A method for operating and controlling a plurality of parental control subsystems in an audiovisual system, wherein the audiovisual system has a computer and wherein said system is configurable by a graphical user interface (GUI), comprising:

interfacing a plurality of audio and/or audiovisual devices to said computer, at least two of said audio and/or audiovisual devices comprising a native parental control subsystem having adjustable parameters;

providing a questionnaire comprising one or more questions for collecting information about a user's desired level of parental control over said audio and/or audiovisual devices;

asking one or more questions selected from said set of questions to collect said information;

translating the information collected into device specific codes for each parental code subsystem;

operating the computer to set the adjustable parameters of each native parental control subsystem within said system, wherein the adjustable control parameters of the native parental control system include a first parental control scheme and a second parental control scheme, the first parental control scheme being incompatible with the second parental control scheme, and wherein the control programming allows a user to choose general control parameters of the first parental control scheme and the second parental control scheme.

16. A method of claim 15, further comprising the step of displaying the collected information.

17. A method of claim 15, further comprising the step of displaying a list of audiovisual devices in said audiovisual system which do not support locks.

18. A method of claim 15, further comprising the step of recommending television channels to lock.

19. A method of claim 15, further comprising the step of recommending ratings to lock.

20. A method of claim 15, further comprising the steps of:

identifying computer games installed on the system;

providing a database of computer game ratings analogous to audiovisual content ratings; and operating the computer to lock any computer games based on said collected information.

21. A method for operating and controlling a plurality of parental control subsystems in an audiovisual system, wherein the audiovisual system has a computer and wherein said system is configurable by a graphical user interface (GUI), comprising:

interfacing at least two audio and/or audiovisual devices to said computer, wherein said at least two audio and/or audiovisual devices include a native parental control subsystem having adjustable parameters, wherein a first audio and/or audiovisual device of the at least two audio and/or audiovisual devices include a first parental control scheme and a second audio and/or audiovisual device of the at least two audio and/or audiovisual devices include a second parental control scheme, the first parental control scheme being incompatible with the second parental control scheme;

operating the computer to receive user input, said user input allowing a user to choose general parental control parameters; and operating the computer to set the adjustable parameters of each native parental control subsystem subsystems of the at least two audio and/or audiovisual devices within said system based on the received user input choosing the one or more general parental control parameters.

22. A method according to claim 1, wherein at least two audio and/or audiovisual devices are interfaced to said computer, the at least two audio and/or audiovisual devices including native parental control subsystems.

23. A method according to claim 15, wherein at least two audio and/or audiovisual devices are interfaced to said computer, the at least two audio and/or audiovisual devices including native parental control subsystems.

24. A method according to claim 1, operating the computer to set the adjustable parameters of each native parental control subsystem subsystems within said system is based on the received user input choosing the one or more general parental control parameters.

25. A method according to claim 15, operating the computer to set the adjustable parameters of each native parental control subsystem subsystems of the at least two audio and/or audiovisual devices within said system based on the translated information.

* * * * *